United States Patent
Yerli

(10) Patent No.: US 11,307,968 B2
(45) Date of Patent: Apr. 19, 2022

(54) SYSTEM AND METHOD FOR DEVELOPING, TESTING AND DEPLOYING DIGITAL REALITY APPLICATIONS INTO THE REAL WORLD VIA A VIRTUAL WORLD

(71) Applicant: THE CALANY HOLDING S. À R.L., Luxembourg (LU)

(72) Inventor: Cevat Yerli, Frankfurt am Main (DE)

(73) Assignee: THE CALANY Holding S. À R.L., Luxembourg (LU)

( * ) Notice: Subject to any disclaimer, the term of this patent is extended or adjusted under 35 U.S.C. 154(b) by 0 days.

(21) Appl. No.: 16/421,155

(22) Filed: May 23, 2019

(65) Prior Publication Data
US 2019/0361797 A1 Nov. 28, 2019

Related U.S. Application Data

(60) Provisional application No. 62/676,072, filed on May 24, 2018.

(51) Int. Cl.
| | | |
|---|---|---|
| *G06F 11/36* | (2006.01) | |
| *G06F 3/01* | (2006.01) | |
| *G06T 19/00* | (2011.01) | |

(52) U.S. Cl.
CPC .......... *G06F 11/3664* (2013.01); *G06F 3/011* (2013.01); *G06F 11/3672* (2013.01); *G06T 19/006* (2013.01)

(58) Field of Classification Search
CPC .. G06F 11/3664; G06F 3/011; G06F 11/3672; G06T 19/006
See application file for complete search history.

(56) References Cited

U.S. PATENT DOCUMENTS

| 5,883,817 A | 3/1999 | Chisholm et al. |
| 5,956,039 A | 9/1999 | Woods et al. |
| (Continued) | | |

FOREIGN PATENT DOCUMENTS

| CN | 100484726 C | 5/2009 |
| CN | 102120325 B | 12/2012 |
| (Continued) | | |

OTHER PUBLICATIONS

Rajappa et al., "Application and Scope Analysis of Augmented Reality in Marketing using Image Processing Technique" (Year: 2016).*

(Continued)

*Primary Examiner* — Phillip H Nguyen
(74) *Attorney, Agent, or Firm* — Christensen O'Connor Johnson Kindness PLLC

(57) ABSTRACT

A system and method for developing, testing, and deploying digital reality applications into the real world via a persistent virtual world system. The system includes a server that stores and computes a persistent virtual world system comprising at least one virtual replica of a corresponding real object, an application development environment module, and an application management environment module. A user device connected to the server via a network accesses one or more of the persistent virtual world system, the application development environment module, and application management environment module. Users view and interact with the digital reality applications in a merged reality comprised of a real world layer comprising real objects, a virtual world layer configured on top of the real world layer and comprising the purely virtual objects and virtual replicas of respective real objects, and one or more digital reality application layers comprising the deployed digital reality applications.

20 Claims, 7 Drawing Sheets

(56) References Cited

U.S. PATENT DOCUMENTS

| | | |
|---|---|---|
| 6,278,479 B1 | 8/2001 | Wilson et al. |
| 6,556,206 B1 | 4/2003 | Benson et al. |
| 7,168,051 B2 | 1/2007 | Robinson et al. |
| 7,529,690 B2 | 5/2009 | Hadi |
| 8,326,704 B2 | 12/2012 | Glazer et al. |
| 8,564,621 B2 | 10/2013 | Branson et al. |
| 9,281,727 B1 | 3/2016 | Coley et al. |
| 9,511,291 B2 | 12/2016 | Lyons et al. |
| 9,573,062 B1 | 2/2017 | Long et al. |
| 9,669,321 B2 | 6/2017 | Reveley |
| 9,704,298 B2* | 7/2017 | Espeset ............... G11B 27/031 |
| 9,721,386 B1* | 8/2017 | Worley, III ........... G06F 9/5066 |
| 10,565,764 B2* | 2/2020 | Han ...................... H04L 67/38 |
| 2002/0116235 A1 | 8/2002 | Grimm et al. |
| 2002/0191017 A1 | 12/2002 | Sinclair et al. |
| 2003/0030658 A1 | 2/2003 | Gibbs et al. |
| 2006/0122917 A1 | 6/2006 | Lokuge et al. |
| 2006/0184886 A1 | 8/2006 | Chung et al. |
| 2007/0168463 A1 | 7/2007 | Rothschild |
| 2008/0263460 A1 | 10/2008 | Altberg et al. |
| 2009/0055019 A1 | 2/2009 | Stiehl et al. |
| 2009/0244059 A1 | 10/2009 | Kulkarni et al. |
| 2009/0326713 A1 | 12/2009 | Moriya |
| 2010/0131865 A1 | 5/2010 | Ackley et al. |
| 2010/0131947 A1 | 5/2010 | Ackley et al. |
| 2011/0060425 A1 | 3/2011 | Freed |
| 2012/0038667 A1 | 2/2012 | Branson et al. |
| 2012/0105475 A1* | 5/2012 | Tseng ...................... G01S 19/13 345/633 |
| 2012/0133638 A1 | 5/2012 | Davison et al. |
| 2012/0149349 A1 | 6/2012 | Quade |
| 2013/0009994 A1 | 1/2013 | Hill |
| 2013/0044106 A1 | 2/2013 | Shuster et al. |
| 2013/0117377 A1 | 5/2013 | Miller |
| 2013/0179576 A1 | 7/2013 | Boldyrev et al. |
| 2014/0063061 A1 | 3/2014 | Reitan |
| 2014/0214504 A1 | 7/2014 | Young et al. |
| 2014/0221090 A1 | 8/2014 | Mutschler et al. |
| 2014/0282220 A1 | 9/2014 | Wantland et al. |
| 2015/0188984 A1 | 7/2015 | Mullins |
| 2016/0300392 A1 | 10/2016 | Jonczyk et al. |
| 2016/0343168 A1* | 11/2016 | Mullins ................... G06F 3/015 |
| 2016/0379415 A1* | 12/2016 | Espeset ..................... G06T 7/20 345/633 |
| 2017/0092223 A1 | 3/2017 | Fain et al. |
| 2017/0243403 A1 | 8/2017 | Daniels et al. |
| 2017/0250930 A1 | 8/2017 | Ben-Itzhak |
| 2017/0286572 A1 | 10/2017 | Hershey et al. |
| 2017/0287496 A1 | 10/2017 | Heitkamp et al. |
| 2017/0289202 A1 | 10/2017 | Krasadakis |
| 2017/0358024 A1 | 12/2017 | Mattingly et al. |
| 2018/0040038 A1 | 2/2018 | Vanslette et al. |
| 2018/0047093 A1 | 2/2018 | High et al. |
| 2018/0060948 A1 | 3/2018 | Mattingly et al. |
| 2018/0089903 A1 | 3/2018 | Pang et al. |
| 2018/0173309 A1 | 6/2018 | Uchiyama et al. |
| 2018/0210436 A1 | 7/2018 | Burd et al. |
| 2018/0231973 A1 | 8/2018 | Mattingly et al. |
| 2018/0281193 A1 | 10/2018 | Favis |
| 2018/0342106 A1 | 11/2018 | Rosado |
| 2018/0349108 A1* | 12/2018 | Brebner ................... G06F 8/34 |
| 2019/0065028 A1 | 2/2019 | Chashchin-Semenov et al. |
| 2019/0102494 A1 | 4/2019 | Mars |
| 2019/0102709 A1 | 4/2019 | Correa et al. |
| 2019/0221036 A1 | 7/2019 | Griffin et al. |
| 2019/0361589 A1 | 11/2019 | Yerli |
| 2020/0098189 A1 | 3/2020 | Pavloff et al. |
| 2020/0175759 A1 | 6/2020 | Russell et al. |
| 2020/0209949 A1 | 7/2020 | Noris et al. |
| 2020/0210137 A1 | 7/2020 | Noris et al. |
| 2020/0211251 A1 | 7/2020 | Noris et al. |
| 2020/0349735 A1 | 11/2020 | Dine et al. |

FOREIGN PATENT DOCUMENTS

| | | |
|---|---|---|
| DE | 10128015 A1 | 12/2001 |
| DE | 102005011126 A1 | 9/2006 |
| JP | 2005539296 A | 12/2005 |
| JP | 2015502584 A | 4/2013 |
| JP | 2016110245 A | 9/2016 |
| JP | 2016209969 A | 12/2016 |
| KR | 10/2018/0020725 A | 4/2019 |
| WO | 02/063454 A1 | 8/2002 |
| WO | 2008/065458 A2 | 6/2008 |
| WO | 2008/065458 A3 | 6/2008 |
| WO | 2009/029559 A1 | 3/2009 |
| WO | 2013/050473 A1 | 4/2013 |
| WO | 2016/017254 A1 | 2/2016 |
| WO | 2016/077493 A1 | 5/2016 |
| WO | 2016/164178 A1 | 10/2016 |
| WO | 2017/141391 A1 | 8/2017 |
| WO | 2018/074000 A1 | 4/2018 |
| WO | 2019/079826 A1 | 4/2019 |

OTHER PUBLICATIONS

Extended European Search Report dated Oct. 17, 2019, issued in corresponding European Application No. EP 19176426.5, filed May 24, 2019, 9 pages.

Korean Office Action dated May 26, 2020, issued in corresponding KR Application No. 10-2019-0060412, filed May 23, 2019, 13 pages.

"Walmart Patent Wants You to Shop at Home Using Virtual Reality," Research Brief, Aug. 17, 2018, <https://www.cbinsights.com/research/walmart-virtual-reality-retail-patent/> [retrieved Jun. 5, 2020], 8 pages.

European Search Report dated Jan. 17, 2020, in European Application No. 19176436.4, filed May 24, 2019, 33 pages.

Massachusetts Institute of Technology, "Huggable", Jul. 17, 2013, <http://www.youtube.com/watch?v=Z-8_RhkdvoA> [retrieved Sep. 6, 2019], 2 pages.

Partial European Search Report dated Sep. 9, 2019, in European Application No. 19176436.4, filed May 24, 2019, 18 pages.

Alsamhi, S.H., et al, "Artificial Intelligence-Based Techniques for Emerging Robotics Communication: A Survey and Future Perspectives", Arxiv.Org, Cornell University Library, 201 Olin Library, Cornell University Ithaca, New York, Apr. 25, 2018, pp. 1 10.

Alsamhi, S.H., et al, "Artificial Intelligence-Based Techniques for Emerging Robotics Communication: A Survey and Future Perspectives", Arxiv.Org, Cornell University Library, 201 Olin Library, Cornell University Ithaca, New York, Apr. 25, 2018, pp. 1 10.

Office Action dated Aug. 26, 2020, issued in U.S. Appl. No. 16/903,235, filed Jun. 16, 2020, 21 pages.

Office Action dated Aug. 24, 2020, issued in U.S. Appl. No. 16/903,239, filed Jun. 16, 2020, 19 pages.

Extended European Search Report dated Sep. 14, 2020, issued in European Application No. 20176245.7, 8 pages.

European Search Report dated Nov. 18, 2020, issued in European Application No. 20180856.5, 12 pages.

European Search Report dated Nov. 17, 2020, issued in European Application No. 20180736.9, 13 pages.

European Search Report dated Oct. 27, 2020, issued in European Application No. 20180712.0, 11 pages.

Extended European Search Report dated Nov. 16, 2020, issued in European Application No. 20180885.4, 12 pages.

Extended European Search Report dated Nov. 18, 2020, issued in European Application No. 20180739.3, 12 pages.

Extended European Search Report dated Nov. 18, 2020, issued in European Application No. 20180723.7, 12 pages.

Yang, X., et al., "Virtual Reality Tools for Internet-Based Robotic Teleoperation", Proceedings of the Eighth IEEE International Symposium on Distributed and Real-Time Applications, 2004, 5 pages.

Microsoft Developer: "Developing Mobile Augmented Reality (AR) Applications with Azure Spatial Anchors—BRK2034", May 14, 2019 (May 14, 2019), pp. 1-8, XP54981052, Retrieved from the Internet: URL:https://www.youtube.com/watch?v=CVmfP8 TaqNU [retrieved on Oct. 30, 2020].

(56) References Cited

OTHER PUBLICATIONS

Office Action dated Jan. 11, 2021, issued in U.S. Appl. No. 16/903,239, filed Jun. 16, 2020, 28 pages.
Office Action dated Jan. 11, 2021, issued in U.S. Appl. No. 16/903,235, filed Jun. 16, 2020, 26 pages.
Asanuma, K., et al., "User Interface for Remote Operation of a Moving Robot via Internet", 9 pages.
Office Action dated Feb. 17, 2021, issued in U.S. Appl. No. 16/904,213, filed Jun. 16, 2020, 18 pages.
Office Action dated Nov. 19, 2020, issued in Japanese Application No. 2019096980, 42 pages.
WEB+DB Press, vol. 32, May 25, 2006, ISBN 4-7741-2752-3, p. 10-17.
Yoshiyuki Hashimoto, "iOS iBeacon/GeoFence/Navi/CoreMotion/M7" (Japanese version), Mar. 1, 2014, ISBN 978-4-7980-4070-7, pp. 82-94.
Micheal Lanham, "Unity AR" (Japanese version), Sep. 1, 2017, ISBN 978-4-87311-810-9, 26 pages.
Jeffrey Richter, "Windows Runtime" (Japanese version), Jun. 9, 2014, ISBN 978-4-8222-9831-9, pp. 291-300.
Office Action issued in Japanese Application No. 2019096678, 3 pages.
Rajappa et al., "Application and Scope Analysis of Augmented Reality in Marketing using Image Processing Technique" (2016).
Office Action dated Apr. 26, 2021, issued in U.S. Appl. No. 16/903,227, filed Jun. 16, 2020, 40 pages.
Klas et al., "VR is on the Edge: How to Deliver 360° Videos in Mobile Networks," VR/AR Network '17, ACM, Aug. 2017, pp. 30-35.
Foley et al., "KD-Tree Acceleration Structures for a GPU Raytracer," Graphics Hardware 2005, ACM, Jul. 2005, pp. 15-22.
DiVerdi et al., "Level of Detail Interfaces," Proc. Third IEEE and ACM Int'l Conf. on Mixed and Augmented Reality (ISMAR 2004), 2 pages.
Office Action dated Dec. 27, 2021, issued in U.S. Appl. No. 16/902,074, filed Jun. 15, 2020, 32 pages.

* cited by examiner

SYSTEM AND METHOD FOR DEVELOPING, TESTING AND DEPLOYING DIGITAL REALITY APPLICATIONS INTO THE REAL WORLD VIA A VIRTUAL WORLD

CROSS-REFERENCE TO RELATED APPLICATION

This application claims the benefit of Provisional Application No. 62/676,072, filed May 24, 2018, the entire disclosure of which is hereby incorporated by reference herein for all purposes.

FIELD

The present disclosure generally relates to computer systems, and more specifically to a system and method for developing, testing and deploying one or more digital reality applications into the real or virtual world via a persistent virtual world system.

BACKGROUND

Technology developments for providing digital reality application content to users have enabled experiences that were not possible in the past. Particularly, digital realities, such as augmented reality (AR), virtual reality (VR), and mixed reality (MR), change a user's perception on what they are seeing, hearing, and feeling, and how much of the real world comes into these experiences, providing the user with a sensation of a physical presence in places in the real world or an imagined world.

Development, testing, and deployment of digital reality applications may be computationally intensive. Furthermore, the variable nature of digital reality environments poses challenges for developers when creating digital reality applications. What is desired is a system and method to ease development, deployment, and operation of digital reality applications in a less computationally-intensive way and in an integrated ecosystem.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Drawbacks described in the background are addressed by the current disclosure through a system and method that allows the integrated development, testing, and deployment of digital reality applications in the real world via a persistent virtual world system.

A system for developing, testing, and deploying digital reality applications comprising positional digital reality applications, areal digital reality application services, or combinations thereof, comprises at least one server comprising memory and at least one processor, the memory storing a persistent virtual world system comprising at least one virtual replica of a corresponding real object, wherein the virtual 3D world coordinates and virtual properties of the virtual replicas are based on the 3D world coordinates and properties of the real objects; and at least one user device connected to the server via a network and configured to access the persistent virtual world system, wherein one or more users view and interact with the one or more digital reality applications in a merged reality comprised of a real world layer, a virtual world layer configured on top of the real world layer, and one or more digital reality application layers configured on top of the virtual world layer.

In the current disclosure, digital reality applications may include positional digital reality applications or areal digital reality application services, or combinations thereof. The positional digital reality applications are configured through the persistent virtual world system on one or more predetermined and precise 3D world locations, comprising 3D position and orientation, and can have multiple instances of 3D world locations. The areal digital reality application services refer to application services persistently available on one or more predetermined geographical areas covering one or more positional digital reality applications, where they can provision users within or in proximity to those areas with respective application services related to the one or more positional digital reality applications. The positional digital reality applications and areal digital reality applications services are configured on top of the one or more digital reality application layers.

The memory of the server further stores an application development environment module configured to enable application developers to access the virtual world system to develop one or more digital reality applications, and an application management environment module configured to enable application administrators to access the persistent virtual world system to receive, manage, and deploy the one or more digital reality applications.

In some embodiments, the at least one server may use a cloud-to-edge infrastructure that may implement distributed computing capabilities, employing public or private clouds, cloudlets and edge systems, such as enterprise systems, mobile platforms, and/or user devices. In some embodiments, processing and provisioning of digital reality applications are based on the proximity of the at least one user device to the at least one digital reality application. In further embodiments, the processing and provisioning are server-based, client-based, or combinations thereof. In further embodiments, when the at least one user device is in proximity to a plurality of digital reality applications, the server may proceed to compute and composite the media content of the plurality of applications in the field of view or wide view of the one or more users and transmit the composited media content to the user device.

According to an embodiment, the persistent virtual world system comprises a virtual 3D infrastructure including one or more virtual replicas, purely virtual objects, virtual corridors, positional digital reality applications, or areal digital reality application services, or combinations thereof enabling spatial organization, behaviors, computational and logical interactions between each other and with elements of the real world layer through their corresponding virtual replicas.

According to an embodiment, although publishing of the applications during deployment is done on the one or more digital reality application layers, which are persistent layers, during engagement by users, one or more positional digital reality applications or areal digital reality application services can filter through and process a plurality of elements of the virtual world layer, comprising virtual replicas and purely virtual objects that are relevant to the specific one or more positional digital reality applications or areal digital reality application services.

In some embodiments, the application development environment module includes development, settings, and testing sub-modules. These sub-modules are configured to enable an application developer to seamlessly develop, test, and configure the one or more digital reality applications or digital reality application layers, comprising adjusting the content, positional or areal location and space settings including 3D positioning and scaling, the time settings, and target user parameters for the one or more digital reality applications or digital reality application layers. In the location and space settings sub-module, the digital reality applications are positioned on the one or more digital reality application layers on top of the virtual world layer where, after future deployment, users can find them for interaction. Once the one or more digital reality applications have been developed, configured, and tested, the application developer may proceed to share the one or more digital reality applications with an application administrator through the application management environment module.

The application management environment module comprises the one or more shared digital reality applications, an application management testing sub-module, a rule-based application assessment sub-module, an application deployment sub-module, and an online application library. In the application management environment module, the application administrator may test, through the application management testing sub-module, the digital reality application. After testing the application via the application testing sub-module and after assessing the suitability of the application via the rule-based application assessment sub-module, the application administrator may determine that the one or more digital reality applications require adjustments. The application administrator may thus send adjustment requests to the application developer. The application developer may subsequently adjust the one or more digital reality applications and, once approved, the application administrator may deploy and test deploy the one or more digital reality applications into an online application library for interaction with end users via the application deployment sub-module. The deployed one or more digital reality applications include the configuration previously set by the application developer and approved by the application administrator. In other words, the deployed application includes the content, real and/or virtual location and space settings including 3D positioning and scaling, time settings, and target user parameters defined for the one or more digital reality applications. The users may interact with the digital reality application via devices connected to the server via a network, wherein the server may service, stream, distribute, compute, and/or render the digital reality application content for the user.

The one or more digital reality applications may be configured into the real world via the persistent virtual world system stored in the memory of the server. The persistent virtual world system refers in the current disclosure to a virtualized version of the real world comprising real-world coordinates, such as 3D position, orientation, and scale of real objects, including latitudinal and longitudinal positional and orientation data, which are incorporated into the settings of the virtual replicas of the real world. The persistent virtual world system can include a detailed world map according to a real-life model where each entity (e.g., buildings, trees, people, etc.) is modeled based on real-world data, but which may, as well, include virtual objects not based on real-world data. Thus, when configuring one or more positional digital reality applications, an application developer may attach digital reality applications to one or more virtual replicas existing in the persistent virtual world system, so that the digital reality application may be viewed as an extension of the existing virtual replica. However, in other embodiments, the positional digital reality applications may be attached to a location of the persistent virtual world system without being attached to a specific virtual replica, but being positioned with respect to other virtual replicas in the persistent virtual world system. In other embodiments, areal digital reality application services may be attached to one or more geographic areas of the persistent virtual world system not linked to a specific virtual replica. Thus, developing, testing, assessing and deploying the digital reality applications using the persistent virtual world system as a reference can provide application developers, administrators and end-users with a sensation of the world being a development space.

According to an embodiment, a method facilitating development, testing, and deployment of digital reality applications into the real world includes the steps of providing, by at least one server comprising memory and at least one processor, one or more digital reality applications and a persistent virtual world system comprising at least one virtual replica of a corresponding real object, wherein the virtual 3D world coordinates and virtual properties of the virtual replicas are based on the 3D world coordinates and properties of the real objects; and receiving, by the at least one server, input from at least one user device accessing the persistent virtual world system. The at least one user device is connected to the at least one server via a network. The persistent virtual world system allows one or more users to view and interact with the one or more digital reality applications in a merged reality comprising a real world layer, a virtual world layer configured on top of the real world layer, and one or more digital reality application layers configured on top of the virtual world layer.

In some embodiments, the input may be related to development of the one or more digital reality applications. In such cases, the at least one server may facilitate further steps of developing the one or more digital reality applications by an application developer via an application development environment module; sharing, by the application developer, the digital reality application with an application management environment module; testing, by the application administrator via the application management environment module, the digital reality application for compliance evaluation; approving/rejecting, by the application administrator via the application management environment module, the digital reality application; sending, when required, application adjustment requests to the application development environment module; adjusting the application by the application developer via the application development environment module; and deploying and test deploying, by the application administrator, the digital reality application in an online application library once the digital reality application is compliant with the application administrator compliance parameters.

According to an embodiment, developing the one or more digital reality applications via the application development environment module further comprises setting-up, by the application developer, the application configuration (e.g., location, time, and target user parameters, amongst others); testing, by the application developer, the digital reality application in an application development space; and carrying out, by the application developer, further testing in a virtual world final positional or areal location in virtual reality, and in the real world final positional or areal location in augmented reality.

The application library of the current disclosure where the one or more digital reality applications are positioned and deployed may be considered as the digital reality application layer configured on top of a virtual world layer of the persistent virtual world system, which is in turn configured on top of a real world layer. The virtual world layer comprises the one or more virtual replicas and purely virtual objects. This set of layers forms a merged reality, where users employing user devices may view and interact with digital reality applications and at least some virtual replicas in augmented reality, virtual reality, or combinations thereof. As all or most of the real objects of the real world are mapped or virtualized into the persistent virtual world system, users located in areas of the persistent virtual world system may have a sensation that the real world is an application library with digital reality applications configured in several parts of the real world.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages of the present disclosure will be apparent from the accompanying drawings and from the detailed description that follows below.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
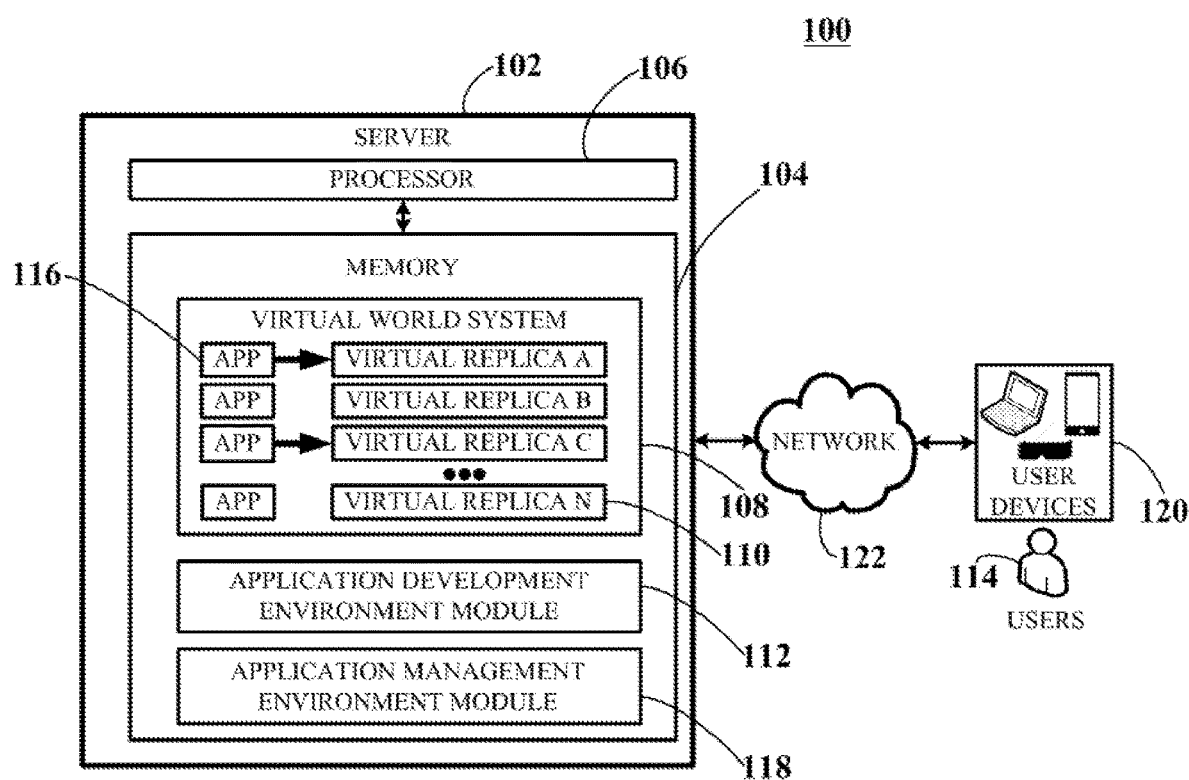
FIG. 1 depicts a diagram of a system for developing, testing, and deploying one or more digital reality applications into the real world through a persistent virtual world system, according to an embodiment.

FIG. 1 depicts a system 100 which may be used for developing, testing, and deploying one or more digital reality applications comprising positional digital reality applications, areal digital reality application services, or combinations thereof, into the real world through a persistent virtual world system, according to an embodiment.

The system 100 may include at least one server 102 comprising memory 104 and at least one processor 106, the memory 104 storing one or more digital reality applications and a persistent virtual world system 108 comprising at least one virtual replica 110 (e.g., virtual replicas A-N) of a corresponding real object (not shown), wherein the virtual 3D world coordinates and virtual properties of the virtual replicas 110 are based on the 3D world coordinates and properties of the real objects; an application development environment module 112 configured to enable users 114 (e.g., application developers) to access the persistent virtual world system 108 and to develop one or more digital reality applications 116, and an application management environment module 118 configured to enable users 114 (e.g., application administrators) to manage the one or more digital reality applications 116 created via the application development environment module 112. Users 114, depending on their entitlement, may access one or more of the persistent virtual world system 108, application development environment module 112, and application management environment module 118 via user devices 120 connected via a network 122. The at least one processor 106 is configured to execute instructions on data of the virtual replicas 110 and digital reality applications 116. In some embodiments, the persistent virtual world system 108 is configured to allow users to view and interact with digital reality applications 106 in a merged reality comprising a real world layer, a virtual world layer configured on top of the real world layer, and one or more digital reality application layers configured on top of the virtual world layer, as described in further detail below.

In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and digital reality applications therein comprised continue to exist after the processes used for creating the virtual replicas cease purely virtual objects and digital reality applications, and independent of users being connected to the virtual world system. Thus, the virtual world system is saved in non-volatile storage location in the server. In this way, virtual replicas, purely virtual objects and digital reality applications may interact and collaborate with each other when being configured for accomplishing specific goals even if users are not connected to the server.

The application development environment module 112 is configured to enable one or more users together or separately 114, such as one or more application developer, to connect, develop, create and test one or more digital reality applications through the virtual world system 108, and share one or more digital reality applications 116 with an application management environment module 118. The application management environment module 118 is configured to enable one or more users 114, such as an application administrator, to perform compliance testing, deployment and test deployment of the digital reality application 116 into an online application library that can be accessed by end users via user devices 120.

In some embodiments, the digital reality applications 116, once deployed and test deployed, may be attached to a virtual replica 110 existing in the persistent virtual world system 108, which may be symbolized in FIG. 1 by arrows pointing from some of the digital reality applications 116 onto at least one virtual replica 110. Thus, the one or more digital reality applications 116 may be configured in the same location as the virtual replica 110, and may be viewed as an extension of the existing virtual replica 110. However, in other embodiments, the one or more digital reality applications 116 may be attached to a location of the persistent virtual world system 108 without being attached to a specific virtual replica 110. In other embodiments, specifying the area of the one or more areal digital reality application services of the one or more digital reality applications 116 comprises attaching the one or more areal digital reality application services to one or more geographic areas of the persistent virtual world system 108 not linked to a specific virtual replica The virtual replicas 110 in the persistent virtual world system 108 can be developed based on the shape, location, position and orientation, other properties (e.g., physical and logical properties) and the expected functioning and systemic impact (e.g., energy consumption, traffic behavior, carbon emissions, etc.) of each of the real objects from which the virtual replicas 110 are based. Thus, for example, the virtual replicas 110 may include data and instructions that are input through software modules and tools included in a replica editor (not shown) configured to input the data and instructions of each virtual replica 110 that can enable configuring each of these properties. However, the virtual replicas 110 may also represent objects that do not exist in real life, such as purely virtual objects. These virtual replicas 110 representing purely virtual objects can also be positioned with respect to the location of real objects, and may also have digital reality applications 116 attached thereupon.

In some embodiments, a virtual replica includes one or more of 3D world and building data, such as SLAM or derivate-mapping based data; 3D geometry data; 3D point cloud data; or geographic information system data representing real-world structural properties that may serve to model a 3D structure for digital reality applications.

The persistent virtual world system 108 is a virtualized version of the real-world comprising real-world coordinates, such as 3D position, orientation, and scale of real objects, including latitudinal and longitudinal positional and orientation data, which are incorporated into the settings of the virtual replicas 110. The persistent virtual world system 108 can include a detailed world map according to a real-life model where each entity (e.g., buildings, trees, people, etc.) is modeled based on real-world data, but which may, as well, include virtual objects not based on real-world data. Modeling techniques for converting real-world objects into virtual replicas 110 may be based on techniques known in the art. In one embodiment, the virtual replicas 110 may be modeled based on readily-available computer-assisted drawing (CAD) models of the real-world elements. For example, machine owners may provide already-existing digital CAD models of their machines. Similarly, building owners or government authorities may provide building information models (BIMs), which are digital representations of physical and functional characteristics of a facility, and store them in the persistent virtual world system 108. In other embodiments, the virtual replicas may be modeled through car or drone-based image-scanning pipelines to be input through a variety of photo, video, depth simultaneous location and mapping (SLAM) scanning. In other embodiments, radar-imaging, such as synthetic-aperture radars, real-aperture radars, Light Detection and Ranging (LIDAR), inverse aperture radars, monopulse radars, and other types of imaging techniques may be used to map and model real-world elements before integrating them into the persistent virtual world system 108. Radar-imaging solutions may be performed especially in cases where the original models of the structures are not available, or in cases where there is missing information or there is a need to add additional information to the virtual world entities which is not provided by the CAD models.

According to an embodiment, the digital content provided by the digital reality applications 116 may include at least one of the following: image data, 3D geometries, video data, audio data, haptic data, textual data, or a combination thereof. One or more parts of the digital content to be provided to the at least one user 114 may include augmented reality (AR), virtual reality (VR) digital content, or combinations thereof. If a user 114 views the digital content as AR digital content, the AR digital content includes real-world environment elements augmented by computer-generated sensory input such as sound, video, graphics, or GPS data. Augmentation techniques are typically performed in real-time and in semantic context with environmental elements, such as overlaying supplemental information or virtual objects in the real world. The AR digital content allows information about the surrounding real world of the user 114 or virtual objects overlay in the real world to become interactive and digitally interactive. If a user 114 views the digital content as VR digital content, the VR digital content may include virtual elements that are used to replace the real world with a simulated one.

The at least one server 102 may provide computing resources sufficient to carry out heavy load applications, such as servicing, distributing, computing, streaming, and/or rendering digital content from one or more digital reality applications 116 for interaction by users 114. In preferred embodiments, the computing environment of the servers 102 is run on an abstracted, virtualized infrastructure that shares resources such as CPU, memory and storage between applications, such as in cloud servers. Using a cloud computing network, access to computing power, computer infrastructure (e.g., through so-called infrastructure as a service, or IaaS), applications, and business processes can be delivered as a service to users 114 on demand.

In some embodiments, processing and provisioning of the at least one digital reality application 116 is based on the proximity of the one or more user devices 120 to the at least one digital reality application 116. In some embodiments, processing and provisioning of the at least one digital reality application 116 are server-based, client-based, or combinations thereof. In embodiments of server-based processing and provisioning, when one or more user devices 120 employed by users 114 are in proximity to the at least one digital reality application 116, most of the processing and optionally the rendering of the at least one digital reality application 116 is done by the at least one processor 106 of the at least one server 102. Therefore, when one or more user devices 120 are in proximity to the at least one digital reality application 116, the at least one processor 106 of the server 102 may geospatially (i.e., based on the current real or virtual position and orientation of the user 114 using a user device 120) process, optionally render, and transmit the one or more digital reality application media content to users 114 for output by the user devices 120, leaving only lightweight operations and computing to be performed by the user devices 120. In embodiments of client-based processing and provisioning, when users 114 are in proximity to the at least one digital reality application 116, the server 102 may proceed to transmit the one or more digital reality applications for local processing and execution by the user devices 120.

In other embodiments, when one or more user devices 120 employed by users 114 are in proximity to a plurality of positional digital reality applications or areal digital reality application services of the one or more digital reality applications 116 in the field of view (e.g., up to 90 degrees) or wide view (e.g. more than 90 degrees, such as 120 degrees, 180 degrees, or even 360 degrees) of the one or more users 114, the server 102 can proceed to compute and composite the media content of the plurality of positional digital reality applications or areal digital reality application services of the one or more digital reality applications 116 in the field of view or wide view of the one or more users 114 and transmit those composited media content to the user device 120.

In some embodiments, the at least one server 102 may use a cloud-to-edge infrastructure that may implement distributed computing capabilities, comprising employing public or private clouds, cloudlets and edge systems, such as enterprise systems, mobile platforms, and user devices. This way, resources including physical servers and network equipment enable a shared storage and computing that may be dynamically allocated depending on factors such as the distance of the user to the resources and the network and computational demand from the users.

In an embodiment, in order to reduce hardware and network demands, contribute to the reduction of network latency, and improve the general digital reality experience, the digital reality ecosystem may connect through a network 122 including millimeter-wave (mmW) or combinations of mmW and sub 6 GHz communication systems, such as through $5^{th}$ generation wireless systems communication (5G). In other embodiments, the system may connect through wireless local area networking (Wi-Fi) providing data preferably at 16 GHz. Provided communication systems may allow for about 1 to about 5 millisecond end-to-end (E2E) latency and 1-10 Gbps downlink speeds to end points in the field, complying with parameters necessary for executing the typically highly interactive digital reality applications. This results in high-quality, low latency, real-time digital application content streaming. In other embodiments, the digital reality ecosystem may communicatively connect through 4th generation wireless systems communication (4G), may be supported by 4G communication systems, or may include other wired or wireless communication systems.

User devices 120 may include, for example, mobile phones, smart phones, smart contact lenses, head-up displays, PDAs (personal digital assistant), handheld game devices, portable media players, personal computers, game consoles, media centers, or devices specifically designed for interacting with digital reality (e.g., VR/AR/MR glasses, VR/AR/MR contact lenses, etc.), and the like.

In some embodiments, user interaction with digital content may be gesture-enabled, whereby the user 114 employs one or more gestures for interaction through the user devices 120. For example, the gestures can be natural user interface (NUI) gestures. NUI may be defined as any interface technology that enables a user 114 to naturally interact with a device, free from artificial constraints imposed by input devices such as mice, keyboards, remote controls, and the like. Examples of NUI methods include those methods that employ gestures, such as tactile and non-tactile interfaces such as speech recognition, touch recognition, facial recognition, stylus recognition, air gestures (e.g., hand poses and movements and other body/appendage motions/poses), head and eye tracking, voice and speech utterances, and machine learning related to vision, speech, voice, pose, and/or touch data, for example.

Figure 2:
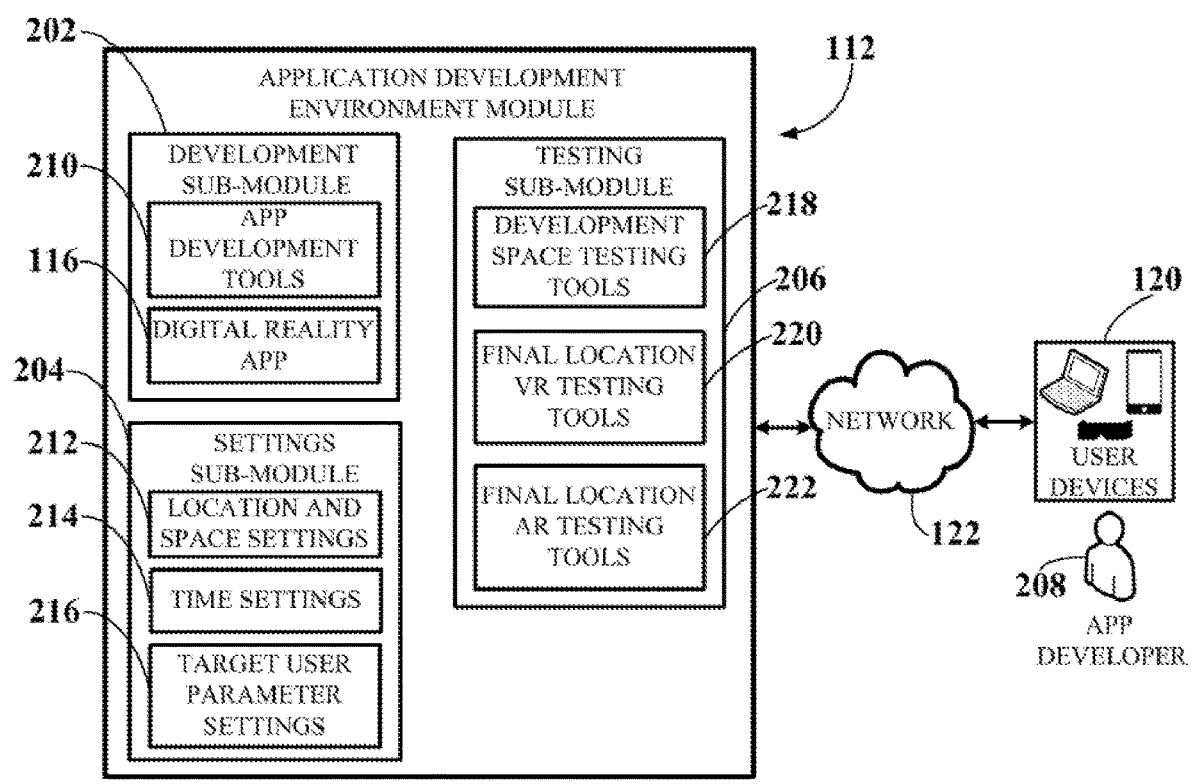
FIG. 2 depicts a diagram of an application development environment module for developing and testing one or more digital reality applications into the real world through a persistent virtual world system, according to an embodiment.

FIG. 2 depicts an application development environment module 112, which may be used for developing, testing, and deploying a digital reality application 116 into the real world through a persistent virtual world system, according to an embodiment. Some elements of FIG. 2 may be similar to elements of FIG. 1, and thus similar or identical reference numerals may be used to identify those elements. The application development environment module 112 includes a development sub-module 202, a settings sub-module 204, and a testing sub-module 206.

The development sub-module 202 is configured to enable one or more application developers 208 to develop one or more digital reality applications 116. The development sub-module 202 includes application development tools 210, such as real-time 3D game engine software development kits (SDKs), in order to build the one or more digital reality applications 116. The settings sub-module 204 is configured to allow the one or more application developers 208 to set various features that are necessary for suitable deployment of the digital reality application 116. The settings sub-module 204 may include location and space settings 212, time settings 214, and target user parameter settings 216.

The location and space settings 212 is configured to enable defining the one or more positional or areal locations where the at least one digital reality application 116 may be available to end users, including the relative three-dimensional position and scaling of the at least one digital reality application 116. The one or more digital reality applications 116 are thus positioned on one or more digital reality application layers on top of the persistent virtual world system representing the real world, where users can find them for interaction.

In some embodiments, specifying the location and space of the one or more positional digital reality applications through the location and space settings 212 comprises attaching the one or more positional digital reality applications to one or more virtual replicas existing in the persistent virtual world system. In other embodiments, specifying the location and space of the one or more positional digital reality applications through the location and space settings 212 comprises attaching the one or more digital reality applications to empty locations of the persistent virtual world system not linked to a specific virtual replica. In other embodiments, specifying the area of the one or more digital reality application services through the location and space settings 212 comprises attaching the one or more areal digital reality application services to one or more geographic areas of the persistent virtual world system not linked to a specific virtual replica. For example, the settings sub-module 204 may be configured to attach one or more positional digital reality applications to one or more virtual replicas existing in the persistent virtual world system or to empty locations of the persistent virtual world system not linked to a specific virtual replica, or to attach one or more areal digital reality application services to one or more geographic areas of the persistent virtual world system not linked to a specific virtual replica.

The time settings 214 may enable configuring the different time slots in which the digital reality application 116 may be available to users 114. In one embodiment, the time settings 214 may enable the one or more digital reality applications 116 to be configured for being automatically updated or modified at determined intervals. In another embodiment, the time settings 214 may enable the digital reality applications 116 to be disabled at various points in time depending on the time and date. In a further embodiment, the location and space settings 212 may enable the digital reality applications 116 to be configured at specific seasons or during predetermined weather conditions. For example, time settings 214 may determine that a digital reality application 116 may be available only during daytime, during nighttime, during specific hours or for a specific time duration, during summer or winter, or during rainy or dry times of the day. The target user parameter settings 216 may enable the application developer 208 to specify the access rights to the digital reality application 116. For example, the application developer 208 may allow a selected group of users to access the digital reality application 116, such as by demographic parameters (e.g., age or gender). In other embodiments, the target user parameter settings 216 may utilize other rule-based criteria, such as user preference data, general big-data conditions, machine-learning output, and the like.

In some embodiments, the settings submodule 204 may be further configured to enable an adaptive characteristics configuration of the one or more digital reality applications 116. The adaptive characteristics configuration may enable the digital reality applications 116 to change the configurations of one or more characteristics of the at least one digital reality application 116 based on the available settings. For example, the adaptive configuration of the settings submodule 204 can adjust the color, brightness, shades, size, text, sounds, etc., of the one or more digital reality application 116 based on the time of the day, lighting conditions, weather conditions, traffic conditions, and the like. In another example, the adaptive characteristics configuration can increase the brightness of the graphical representation of a digital reality application 116 during the day to increase visibility of the digital reality application 116 during a shiny day, and can adjust down the brightness during nighttime.

The testing sub-module 206 is configured to allow the application developer 208 to test created digital reality applications 116. The testing sub-module 206 may include development space testing tools 218, final location virtual reality testing tools 220, and final location augmented reality testing tools 222. The development space testing tools 218 may include a resource simulator to allow application developers 104 to test applications in development spaces without positioning the digital reality application 116 in the persistent virtual world system. The simulator may thus provide simulated input to the digital reality application 116 to allow for testing and application validation. The final location virtual reality (VR) testing tools 220 may be configured to allow an application developer 208 to test the one or more digital reality applications 116 in a virtual world final positional or areal location in virtual reality. In this scenario, a virtualized version of the area and elements where the digital reality application 116 is to be deployed is required for testing, which may already be stored and computed, for example, in the persistent virtual world system 108 of the server 102 in FIG. 1. The final location augmented reality (AR) testing tools 222 may be configured to allow an application developer 208 to test the one or more digital reality applications 116 in the real world final positional or areal location in augmented reality. In this scenario, the digital reality application 116 and one or more virtual replicas within the persistent virtual world system, which may be involved in an interaction with application developers 208 developing the digital reality application 116, may be overlaid on top of reality for testing. The final location VR and AR testing tools 220 and 222 may be used once a digital reality application 116 has reached a pre-determined level of development, and thus is suitable for testing in the final locations where an end user may interact with the one or more digital reality application 116.

After an application developer 208 has developed a digital reality application 116, the application developer 208 may share the digital reality application 116 with an application management environment module.

Figure 3:
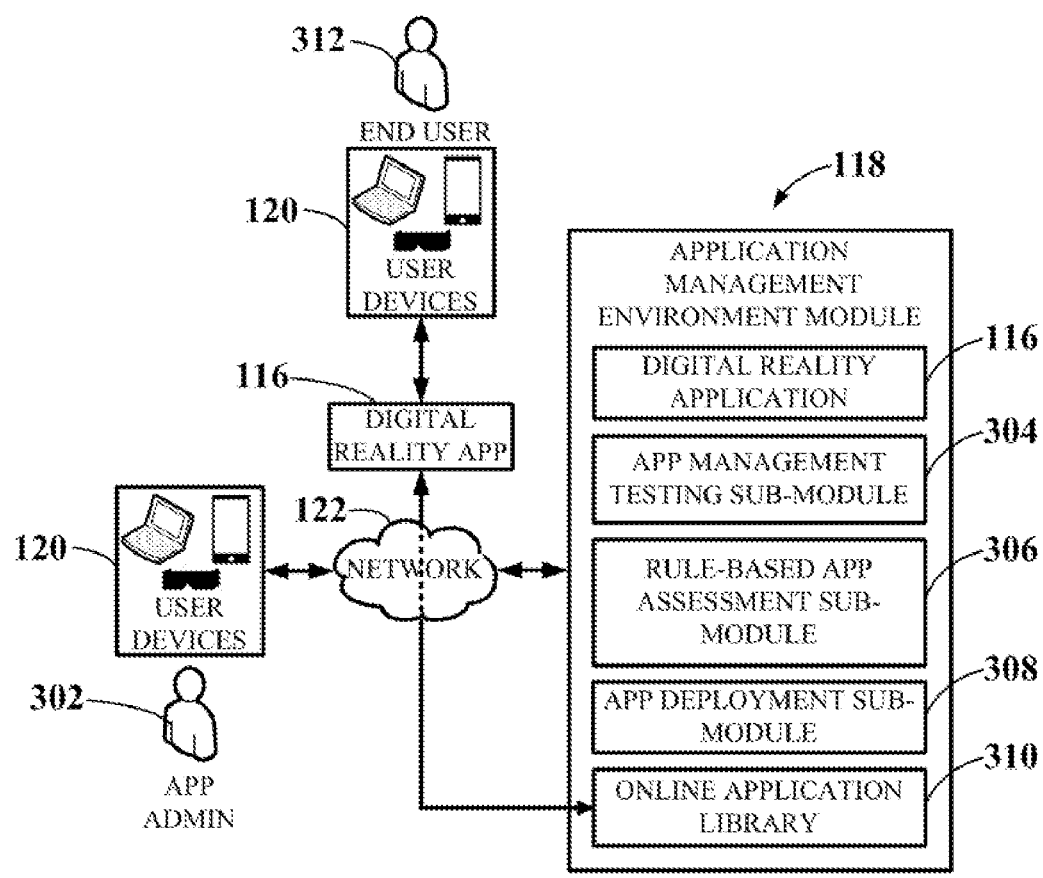
FIG. 3 depicts a diagram of an application management environment module enabling compliance testing and deployment of one or more digital reality applications into the real world through a persistent virtual world system, according to an embodiment.

FIG. 3 depicts a schematic illustration of an application management environment module 118, which may be used for compliance testing and deployment of digital reality applications 116, according to an embodiment. Some elements of FIG. 3 may be similar to elements of FIGS. 1-2, and thus similar or identical reference numerals may be used to identify those elements.

The application management environment module 118 may be accessed by an application administrator 302 by connecting, through suitable user devices 120, to one or more servers hosting the application management environment module 118 (e.g., server 102 of FIG. 1) via a network 122. The application management environment module 118 may include the one or more digital reality applications 116 shared from the application development environment module, an application management testing sub-module 304, a rule-based application assessment sub-module 306, an application deployment sub-module 308, and an online application library 310. The application management testing sub-module 304 may, through suitable user devices 120, enable an application administrator 302 to test the digital reality application 116. Tests performed may comprise testing the different parameters and options of the digital reality application 116 already configured at the application development environment module, such as testing the digital reality application 116 in the one or more final locations, testing at different times of the day, seasons, or weather conditions, or trying out the different target user parameter settings.

Upon the tests performed in the application management testing sub-module 304, the application administrator 302 may employ a rule-based application assessment sub-module 306 in order to determine whether the digital reality application 116 is suitable for deployment and test deployment. The rules upon which the rule-based application assessment sub-module 306 is based may be related to the content, real and/or virtual location and space, time, and target user parameters, amongst others. For example, an application administrator 302 may determine, through the rule-based application assessment sub-module 306, that a digital reality application 116 may not be suitable for deployment and test deployment because part of the content may include scenes that do not comply with these approval/rejection rules. If the application administrator 302 determines that the digital reality application 116 is suitable for deployment and test deployment, the application administrator 302 may employ an application deployment sub-module 308 to enable deployment and test deployment of the digital reality application 116 into the online application library 310. The online application library 310 executes on one or more user devices 120 and provides functionality to allow users 114 to find and access digital reality applications 116.

After deployment and test deployment of the digital reality application 116 by an application administrator 302 into the application library 310, any end user 312 logged into the online application library 310 may be able to view, access and interact with the digital reality applications 116 once the end user 312 is located at a certain distance from the digital reality applications 116. For example, if an application is deployed to be attached to the virtual replica of a real statue, an end user 312 approaching the real statue may be able to view and interact with the application once the digital reality application 116 is within the field of view or wide view of the end user 312.

The application library 310 of the current disclosure may be considered one or more virtual layers, or one or more digital reality application layers, on top of a virtual world layer of the persistent virtual world system, where digital reality applications may be viewed by users in augmented, virtual or mixed reality. As all or most of the real objects of the real world are mapped or virtualized into the persistent virtual world system, users located in areas of the persistent virtual world system may feel that the real world is like an application store, where both real and virtual objects may be viewed and interacted with.

Figure 4A:
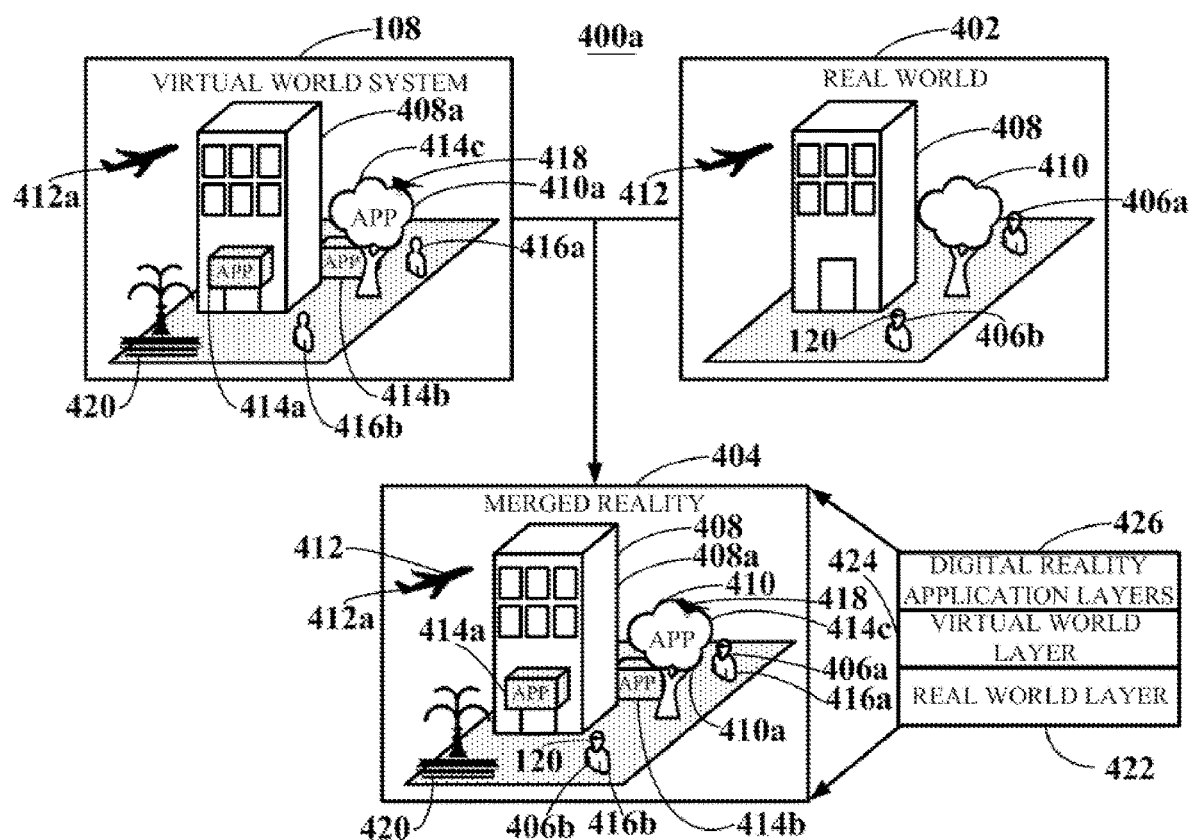
FIGS. 4A-4B depict schematic illustrations of a system for developing, testing, and deploying one or more digital reality applications into the real world through a persistent virtual world system, where a virtual world system and real world are merged into a merged reality enabling deployment of the one or more digital reality applications.
Figure 4B:
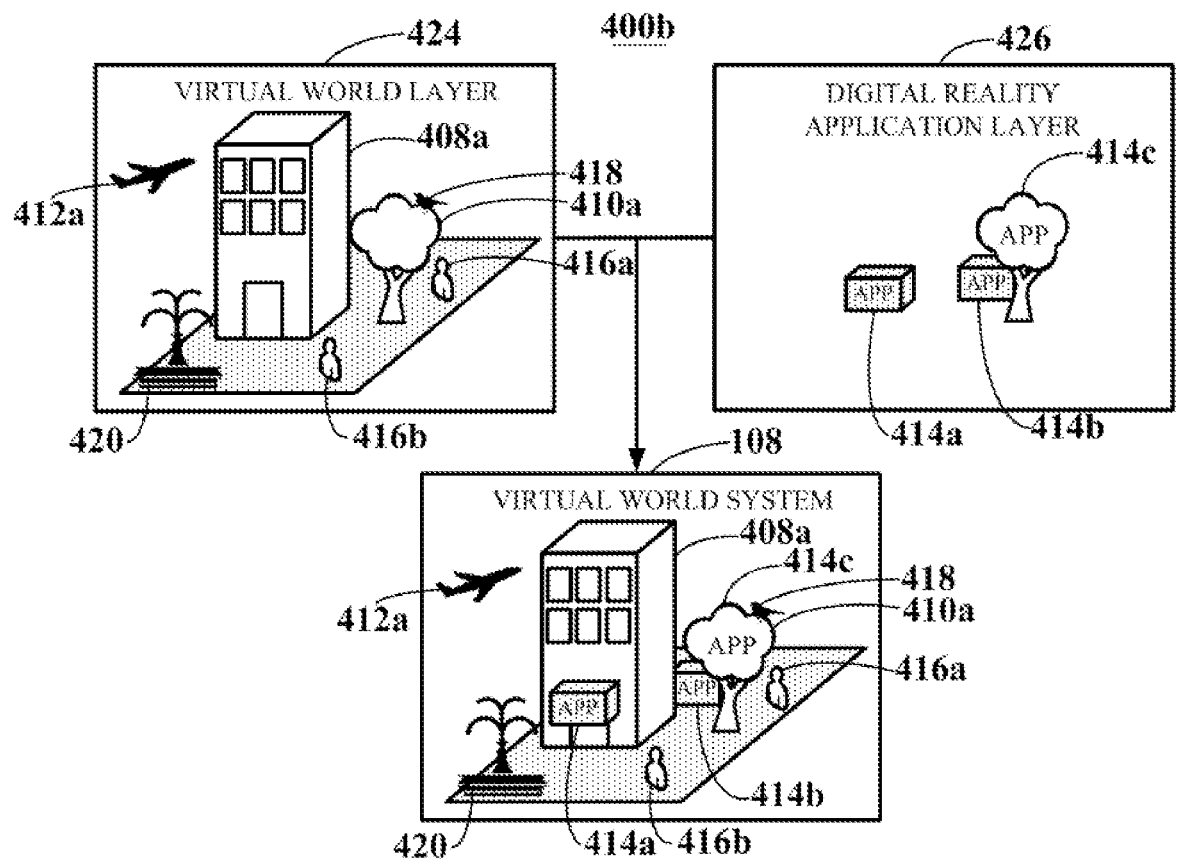

FIGS. 4A-4B depict schematic illustrations of systems 400a-b for developing, testing, and deploying one or more digital reality applications into the real world through a persistent virtual world system, where a virtual world system 108 and real world 402 are merged into a merged reality 404 enabling deployment of the one or more digital reality applications 116. Some elements of FIGS. 4A-4B may be similar to elements of FIGS. 1-3, and thus similar or identical reference numerals may be used to identify those elements.

In the illustration of system 400a in FIG. 4A, two end users 406a-b wearing user devices 120 stand in an area of the real world 402. From the perspective of a person not wearing user devices 120, the real world 402 comprises, for example, a building 408, a tree 410, an airplane 412 and the two end users 406a-b.

In the persistent virtual world system 108 there are three digital reality applications 414a-c, wherein digital reality applications 414a-b have been positioned and deployed in empty areas of the persistent virtual world system 108, whereas the digital reality application 414c has been attached to a tree virtual replica 410a. In the persistent virtual world system 108, end users 406a-b have their own respective virtual avatars 416a-b, while other real objects (e.g., building 408, tree 410 and airplane 412) also have their own virtual replicas (e.g., building virtual replica 408a, tree virtual replica 410a and airplane virtual replica 412a). In addition, in the persistent virtual world system 108 there may be one or more virtual replicas that do not represent an object from the real world (e.g., purely virtual objects such as a virtual bird 418 and a virtual fountain 420).

The merged reality 404 comprises a real world layer 422, a virtual world layer 424 configured on top of the real world layer 422, and one or more digital reality application layers 426 configured on top of the virtual world layer 424. Thus, when deploying digital reality applications into an online application library (e.g., online application library 310 of FIG. 3), the digital reality applications are positioned and deployed on the one or more digital reality application layers 426.

End users 406a-b may, depending on the reality setting selected for interacting with the persistent virtual world system 108 in the merged reality 404 (e.g., virtual reality or augmented reality), view either of the one or more real world objects 408-412; their respective virtual replicas 408-412a; the digital reality applications 414a-c; the purely virtual objects 418-420; or combinations thereof. Users 406a-b may further interact with the one or more virtual replicas 408a-412a, digital reality applications 414a-c, and purely virtual objects 418-420. For example, if an end user views the merged reality 404 in virtual reality, the end user may view and interact with the digital reality applications 414a-c, and depending on the configuration and media content available, may view and interact with the virtual replicas 408a-412a and purely virtual objects 418-420. In another example, if an end user views the merged reality 404 in augmented reality, the end user may view and interact with the digital reality applications 414a-c, may view the real world objects 408-412 and may, depending on the configuration and media content available, view and interact with their respective virtual replicas 408a-412a and with the purely virtual objects 418-420.

In some embodiments of the current disclosure, digital reality applications refer to positional digital reality applications, areal digital reality application services, or combinations thereof. The positional digital reality applications are configured through the persistent virtual world system 108 on one or more predetermined and precise 3D world locations, comprising 3D position and orientation, and can have multiple instances of 3D world locations. The areal digital reality application services refer to application services persistently available on one or more predetermined geographical areas covering one or more positional digital reality applications, where they can provision users within or in proximity to those areas with respective application services related to the one or more positional digital reality applications. The positional digital reality applications and areal digital reality applications services are configured on top of the one or more digital reality application layers 426.

FIG. 4B depicts an illustration of system 400b where the virtual world system 108 comprises the virtual world layer 424 and one or more digital reality application layers 426. The virtual world layer 424 comprises only the virtual elements that may be included in the persistent virtual world system 108, such as virtual replicas 408a-410a and purely virtual objects 418-420. On the other hand, the one or more digital reality application layers 420 comprise only the applications that may be included in the persistent virtual world system 108, such as digital reality applications 414a-414c.

According to an embodiment, a plurality of virtual replicas (e.g., virtual replicas 408a-412a), purely virtual objects (e.g., purely virtual objects 418-420), and digital reality applications (e.g., digital reality applications 414a-c) comprising positional digital reality applications or areal digital reality application services, or combinations thereof in the virtual world system 108, may be considered as a virtual 3D infrastructure comprising accurate properties of each of the real objects (through their virtual replicas), digital reality applications and of purely virtual objects. Thus, for example, this virtual 3D infrastructure of the virtual world layer 424 can enable spatial organization, several behaviors, and computational and logical interactions between digital reality applications 414a-c, virtual replicas 408a-412a and purely virtual objects 418. In some embodiments, the purely virtual objects in the virtual 3D infrastructure further comprise virtual corridors, which can serve to define and delimit the path of real objects through their virtual replicas, purely virtual objects, or digital reality applications. For example, with reference to FIG. 4A, the real airplane 412 (and any digital reality application thereon attached) can have a predetermined flight-path serviced as a virtual corridor and accessed and processed through its respective virtual replica 412a. Likewise, any other moving objects (e.g., flying, driving, walking, etc.) autonomously or manually controlled can use virtual corridor or virtual 3D infrastructure services to navigate, process and compute the real world through the virtual world system 108.

According to an embodiments, although publishing of the applications during deployment is done on the one or more digital reality application layers 426, which are persistent layers, during engagement by users, the one or more positional digital reality applications or areal digital reality application services can filter through and process all or most elements of the virtual world layer 426 comprising the virtual replicas and purely virtual objects that are relevant to the specific digital reality application. For example, a fast food restaurant digital reality application layer can filter all fast food restaurants through their respective virtual replicas, highlighting for users and providing them the necessary data of each restaurant. In another example, a dating application layer can filter for a user only the people that are using such an application, highlighting these people for the user and providing the user with prospects matching the user's background, personality or tastes.

Figure 5:
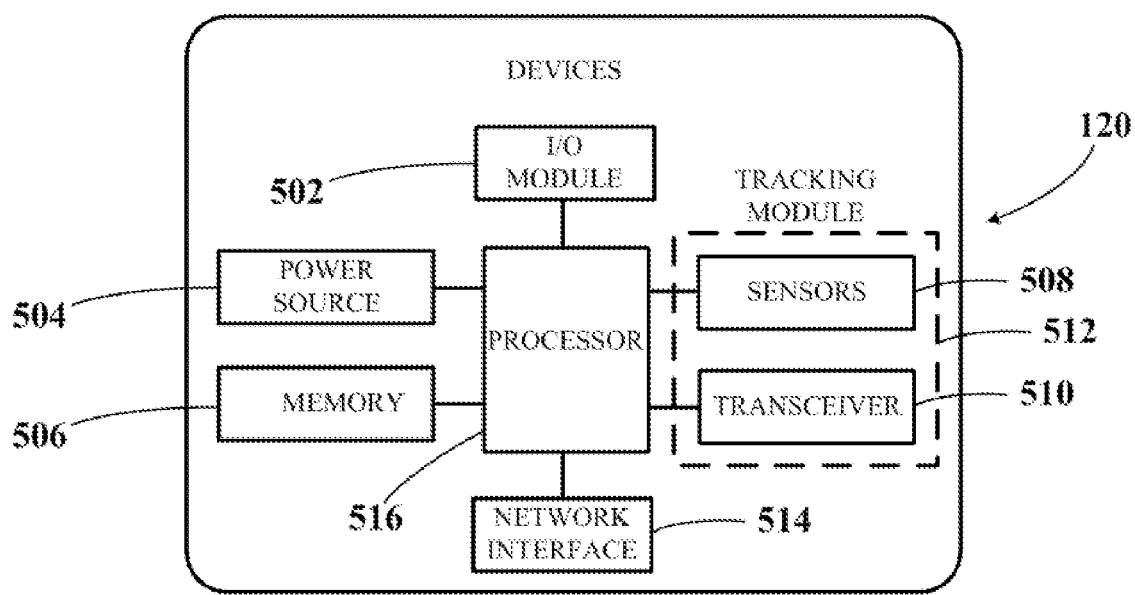
FIG. 5 depicts a diagram of a user device that can be used for developing, testing, and deploying one or more digital reality applications of the current disclosure, according to an embodiment.

FIG. 5 depicts a schematic illustration of a user device 120. A user device 120 may include operational components such as an input/output (I/O) module 502; a power source 504; a memory 506; sensing mechanisms 508 and transceivers 510 forming a tracking module 512; and a network interface 514, all connected to a processor 516.

The I/O module 502 is implemented as computing hardware and software configured to interact with users and provide user input data to one or more other system components. For example, I/O module 502 may be configured to interact with users, generate user input data based on the interaction, and provide the user input data to the processor 516 before being transferred to other processing systems via a network, such as to a server. In another example, I/O modules 502 is implemented as an external computing pointing device (e.g., a touch screen, mouse, 3D control, joystick, gamepad, and the like) and/or text entry device (e.g., a keyboard, dictation tool, and the like) configured to interact with other connected elements. In yet other embodiments, I/O module 502 may provide additional, fewer, or different functionality to that described above.

The power source 504 is implemented as computing hardware and software configured to provide power to the user device 120. In one embodiment, the power source 504 may be a battery. The power source 504 may be built into the devices or removable from the devices and may be rechargeable or non-rechargeable. In one embodiment, the user devices 120 may be repowered by replacing one power source 504 with another power source 504. In another embodiment, the power source 504 may be recharged by a cable attached to a charging source, such as a universal serial bus ("USB") FireWire, Ethernet, Thunderbolt, or headphone cable, attached to a personal computer. In yet another embodiment, the power source 504 may be recharged by inductive charging, wherein an electromagnetic field is used to transfer energy from an inductive charger to the power source 504 when the two are brought in close proximity but need not be plugged into one another via a cable. In another embodiment, a docking station may be used to facilitate charging.

The memory 506 may be implemented as computing hardware and software adapted to store application program instructions and to store multi-source sensory data captured by the sensing mechanisms. The memory 506 may be of any suitable type capable of storing information accessible by the processor 516, including a non-transitory computer-readable medium that stores data that may be read with the aid of an electronic device, such as a hard-drive, memory card, flash drive, ROM, RAM, DVD or other optical disks, as well as other write-capable and read-only memories. The memory 506 may include temporary storage in addition to persistent storage.

The sensing mechanisms 508 may be implemented as computing hardware and software adapted to obtain sensory data from users that can be used during interaction with applications, such as in development, management or end-user interaction with the application. For example, the sensing mechanisms 508 may be used to determine/track the position and orientation of the user device 120 and, therefore, of the one or more virtual replicas and digital reality applications with which the user device 120. The sensing mechanisms may include, in particular, one or more Inertia Measuring Units (IMUs), accelerometers, and gyroscopes. The IMU is configured to measure and report the velocity, acceleration, angular momentum, speed of translation, speed of rotation, and other telemetry metadata of user device 120 by using a combination of accelerometers and gyroscopes. The sensing mechanisms 508 may further comprise cameras comprising optical sensors; haptic sensors; audio sensors, or other suitable sensors used to provide an augmented or virtual reality experience to users.

The transceivers 510 may be implemented as computing hardware and software configured to enable devices to receive wireless radio waves from antennas and to send the data back to the antennas. In some embodiments, mmW transceivers 510 may be employed, which may be configured to receive mmW wave signals from antennas and to send the data back to antennas when interacting with immersive content. The transceiver 510 may be a two-way communication transceiver 510.

In an embodiment, the tracking module 512 may be implemented by combining the capabilities of the IMU, accelerometers, and gyroscopes with the positional tracking provided by the transceivers 510 and the accurate tracking, low-latency and high QoS functionalities provided by mmW-based antennas may enable sub-centimeter or sub-millimeter positional and orientational tracking, which may increase accuracy when tracking the real-time position and orientation of user device 120. In alternative embodiments, the sensing mechanisms and transceivers 510 may be coupled together in a single tracking module device.

The network interface 514 may be implemented as computing software and hardware to communicatively connect to a network, receive computer readable program instructions from the network sent by the server or by other devices, and forward the instructions for storage in the memory 506 for execution by the processor 516.

The processor 516 may be implemented as computing hardware and software configured to receive and process instructions. For example, the processor 516 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 516 may receive user input data from I/O module 502 and may respectively implement application programs stored in the memory 506. In other examples, the processor 516 may receive an accurate position and orientation of user device 120 through the tracking module 512, and may prepare some of the data before sending the data to a server for further processing. The on-device processor 516 may share some of the processing tasks performed by the server.

In some embodiments, user devices 120 may enable NUI interactions through touch sensitive displays, voice and speech recognition, intention and goal understanding, motion gesture detection using depth cameras (e.g., stereoscopic camera systems, infrared camera systems, color camera systems, and combinations thereof), motion gesture detection using accelerometers/gyroscopes, facial recognition, 3D displays, head, eye, and gaze tracking, which may be used to enable AR or VR experiences of the current disclosure.

In some embodiments, to facilitate development, testing, and deployment of digital reality applications, a server computer system may, using techniques described herein, provide one or more digital reality applications and a persistent virtual world system comprising at least one virtual replica of a corresponding real object, wherein the virtual 3D world coordinates and virtual properties of the virtual replicas are based on the 3D world coordinates and properties of the real objects; and receive input from at least one user device accessing the persistent virtual world system. The at least one user device may be connected to the server computer system via a network. The persistent virtual world system allows one or more users to view and interact with the one or more digital reality applications in a merged reality comprising a real world layer, a virtual world layer configured on top of the real world layer, and one or more digital reality application layers configured on top of the virtual world layer.

The input received from the user device(s) may be related to development, testing, or deployment of the digital reality applications. The development may include setting up application configuration, testing the one or more digital reality applications in a development space, and carrying out further testing in augmented and virtual reality final locations. The development may be performed in an application development environment module stored in the memory, whereas management of the digital reality applications may be performed in an application management environment module.

Figure 6:
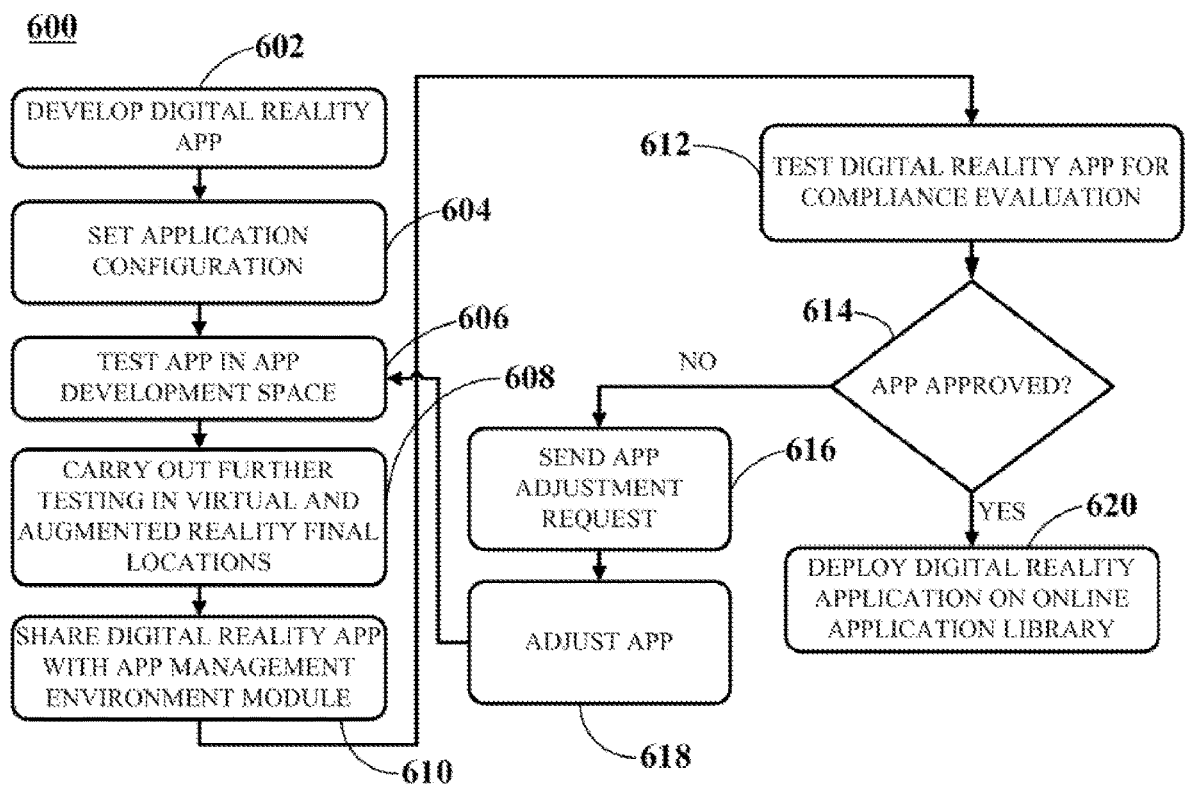
FIG. 6 depicts a block diagram of a method for developing, testing, and deploying one or more digital reality applications into the real world through a persistent virtual world system.

FIG. 6 depicts a method 600 for developing, testing, and deploying one or more digital reality applications comprising positional digital reality applications, areal digital reality application services, or combinations thereof into the real world through a persistent virtual world system, according to an embodiment. The method 600 may be facilitated by software tools implemented by a system of the current disclosure, as disclosed in FIGS. 1-5.

The method 600 may start in step 602 when an application developer creates a digital reality application. For example, and referring to FIG. 2, creating the digital reality application may be achieved employing the development sub-module 202 of the application development environment module 112. Then, in step 604, the method 600 may continue when the application developer sets application configuration parameters. For example, and referring to FIG. 2, the application developer may set the application configuration parameters employing the settings sub-module 204 of the application development environment module 112, whereby location and space settings 212 including location, 3D positioning, and scaling; time settings 214; and target user parameter settings 216 may be defined.

Subsequently, in step 606, the method 600 may continue with the application developer testing the digital reality application in an application development space, such as, for example, the development space testing tools 218 included in the testing sub-module 206 of FIG. 2. In step 608, the application developer carries out further testing of the digital reality application. For example, and referring to FIG. 2, the further testing may employ the final location virtual reality testing tools 220 for testing in a virtual world final positional or areal location in virtual reality, and the final location augmented reality testing tools 222 for testing in the real world final positional or areal location in augmented reality, which are included in the testing sub-module 206.

In step 610, the application developer shares the digital reality application with an application administrator through, for example, the application management environment module 118 of FIG. 3. Then, in step 612, the application administrator tests the digital reality application for compliance evaluation via, for example, the application management testing sub-module 304 of the application management environment module 118.

In check 614, the application administrator may decide whether to approve or reject the digital reality application by employing, for example, the rule-based application assessment sub-module 306 of FIG. 3. As described in FIG. 3, the application administrator may base the decision of whether approving or rejecting the digital reality application taking into account rules related to factors such as content, location and space settings 212, time settings 214, and target user parameter settings 216 described in FIG. 2. If the application administrator rejects the digital reality application, the application administrator may send an application adjustment request to the application developer, as seen in step 616. In step 618, the application developer then proceeds by adjusting the digital reality application based on adjustment requests (e.g., adjustments of content, location settings, time settings, and target user parameter settings, amongst others). Then the method 600 may return to step 606 whereby the application developer tests the application in the application development space. The method 600 may subsequently continue until obtaining approval of the application administrator. If, in check 614, the application administrator decides to approve the digital reality application, then the application administrator may proceed by deploying, based on the previously defined and approved content and configuration, the digital reality application on an online application library, as seen in step 620.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The embodiments of the disclosure in which an exclusive property or privilege is claimed are defined as follows:

1. A system for facilitating development, testing, and deployment of digital reality applications, the system comprising:

at least one server comprising memory and at least one processor, the memory storing one or more digital reality applications and a persistent virtual world system comprising at least one virtual replica of a corresponding real object, wherein virtual 3D world coordinates and virtual properties of the at least one virtual replica are based on 3D world coordinates and properties of the corresponding real object;

wherein the persistent virtual world system is configured to allow one or more users to view and interact with the one or more digital reality applications in a merged reality comprising a real world layer, a virtual world layer configured on top of the real world layer, and one or more digital reality application layers configured on top of the virtual world layer; and wherein the one or more digital reality applications include one or more positional digital reality applications on a predetermined 3D world location or one or more areal digital reality application services on a predetermined geographical area configured to provision an application service to a user within or in proximity to the predetermined geographical area.

2. The system of claim 1, wherein the memory further stores an application development environment module configured to enable access to the persistent virtual world system for developing the one or more digital reality applications, and an application management environment module configured to enable access to the persistent virtual world system for receiving, managing and deploying one or more developed digital reality applications.

3. The system of claim 2, wherein the application development environment module further comprises a testing sub-module configured to test the one or more digital reality applications in a development space, in a virtual world final positional or areal location in virtual reality through the persistent virtual world system, and in the real world final positional or areal location in augmented reality through the persistent virtual world system, and wherein the application management environment module further comprises an application management testing sub-module configured to test the one or more digital reality applications developed and test deployed via the application development environment module.

4. The system of claim 2, wherein the application development environment module further comprises a settings sub-module configured to specify positional or areal location and space, time, and target user parameter settings of the one or more digital reality applications or one or more digital application layers with respect to the persistent virtual world system.

5. The system of claim 4, wherein the settings sub-module is further configured to enable an adaptive characteristics configuration of the one or more digital reality applications.

6. The system of claim 4, wherein the settings sub-module is further configured to attach the one or more positional digital reality applications to the at least one virtual replica existing in the persistent virtual world system or to one or more empty locations of the persistent virtual world system not linked to a specific virtual replica, or to attach the one or more areal digital reality application services to one or more geographic areas of the persistent virtual world system not linked to a specific virtual replica.

7. The system of claim 1, wherein the system is configured for processing and provisioning of the one or more digital reality applications based on proximity of at least one user device to the one or more digital reality applications, and wherein the provisioning and processing are server-based, client-based, or combinations thereof.

8. The system of claim 7, wherein the server is configured to compute and composite media content of a plurality of digital reality applications in a field of view or wide view of the one or more users and transmit the computed and composited media content to the at least one user device where the at least one user device is in proximity to the plurality of digital reality applications.

9. The system of claim 1, wherein the one or more digital reality applications are configured to filter and process a plurality of elements of the virtual world layer that are relevant to the one or more digital reality applications.

10. A method for facilitating development, testing, and deployment of digital reality applications, the method comprising:

providing, by at least one server comprising memory and at least one processor, one or more digital reality applications and a persistent virtual world system comprising at least one virtual replica of a corresponding real object, wherein virtual 3D world coordinates and virtual properties of the at least one virtual replica are based on 3D world coordinates and properties of the corresponding real object; and receiving, by the at least one server, input from at least one user device accessing the persistent virtual world system, wherein the at least one user device is connected to the at least one server via a network, and wherein the persistent virtual world system allows one or more users to view and interact with the one or more digital reality applications in a merged reality comprising a real world layer, a virtual world layer configured on top of the real world layer, and one or more digital reality application layers configured on top of the virtual world layer; and wherein the one or more digital reality applications include one or more positional digital reality applications on a predetermined 3D world location or one or more areal digital reality application services on a predetermined geographical area configured to provision an application service to a user within or in proximity to the predetermined geographical area.

11. The method of claim 10, wherein the input is related to development of the one or more digital reality applications, and wherein the development comprises setting up application configuration, testing the one or more digital reality applications in a development space, and carrying out further testing in augmented and virtual reality final locations.

12. The method of claim 10, wherein the input is related to development of the one or more digital reality applications, and wherein the development is performed in an application development environment module stored in the memory, and wherein management of the one or more digital reality applications is performed in an application management environment module.

13. The method of claim 12, wherein the application development environment module comprises a testing sub-module configured to test the one or more digital reality applications in a development space, in a virtual world final positional or areal location in virtual reality through the persistent virtual world system, and in the real world final positional or areal location in augmented reality through the persistent virtual world system, and wherein the application management environment module further comprises an application management testing sub-module configured to test the one or more digital reality applications developed and test deployed via the application development environment module.

14. The method of claim 12, wherein the application development environment module comprises a settings sub-module configured to specify positional or areal location and space, time, and target user parameter settings of the one or more digital reality applications or one or more digital application layers with respect to the persistent virtual world system.

15. The method of claim 10, wherein the settings sub-module is configured to attach the one or more positional digital reality applications to the at least one virtual replica existing in the persistent virtual world system or to one or more empty locations of the persistent virtual world system not linked to a specific virtual replica, or to attach the one or more areal digital reality application services to one or more geographic areas of the persistent virtual world system not linked to a specific virtual replica.

16. The method of claim 10 further comprising processing and provisioning the one or more digital reality applications, wherein the processing and provisioning are based on proximity of the at least one user device to the one or more digital reality applications, and wherein the provisioning and processing are server-based, client-based, or combinations thereof.

17. The method of claim 16 further comprising, where the at least one user device is in proximity to a plurality of positional digital reality applications or areal digital reality application services:
   computing and compositing media content of the plurality of positional digital reality applications or areal digital reality application services in a field of view or wide view of the one or more users; and
   transmitting the computed and composited media content to the at least one user device.

18. The method of claim 10 wherein the at least one server implements software tools to facilitate the following actions:
   sharing the one or more digital reality applications with an application administrator;
   testing, by the application administrator, the one or more digital reality applications for compliance;
   approving or rejecting the one or more digital reality applications;
   sending, if required, application adjustment requests to the application developer;
   adjusting by the application developer, if required, the one or more digital reality application; and
   deploying by the application administrator, the one or more digital reality applications into an online application library from the application management environment module.

19. One or more non-transitory computer readable-media having stored thereon instructions configured to cause a server computer system comprising memory and at least one processor to perform a method for facilitating development, testing, and deployment of digital reality applications, comprising the steps of:
   providing one or more digital reality applications and a persistent virtual world system comprising at least one virtual replica of a corresponding real object, wherein virtual 3D world coordinates and virtual properties of the at least one virtual replica are based on 3D world coordinates and properties of the corresponding real object; and
   receiving input from at least one user device accessing the persistent virtual world system, wherein the at least one user device is connected to the at least one server via a network, and wherein the persistent virtual world system allows one or more users to view and interact with the one or more digital reality applications in a merged reality comprising a real world layer, a virtual world layer configured on top of the real world layer, and one or more digital reality application layers configured on top of the virtual world layer; and
   wherein the one or more digital reality applications include one or more positional digital reality applications on a predetermined 3D world location or one or more areal digital reality application services on a predetermined geographical area configured to provision an application service to a user within or in proximity to the predetermined geographical area.

20. The one or more non-transitory computer readable-media of claim 19, wherein the input is related to development of the one or more digital reality applications, wherein the development is performed in an application development environment module, wherein management of the one or more digital reality applications is performed in an application management environment module, wherein the application development environment module comprises a settings sub-module, and wherein the settings sub-module is configured to attach the one or more positional digital reality applications to the at least one virtual replica existing in the persistent virtual world system or to one or more empty locations of the persistent virtual world system not linked to a specific virtual replica, or to attach the one or more areal digital reality application services to one or more geographic areas of the persistent virtual world system not linked to a specific virtual replica.

* * * * *

UNITED STATES PATENT AND TRADEMARK OFFICE
CERTIFICATE OF CORRECTION

PATENT NO. : 11,307,968 B2
APPLICATION NO. : 16/421155
DATED : April 19, 2022
INVENTOR(S) : C. Yerli It is certified that error appears in the above-identified patent and that said Letters Patent is hereby corrected as shown below:

In the Claims

| Column | Line | |
|--------|------|---|
| 21 | 41 | change "reality application" to -- reality applications -- |

Signed and Sealed this
Sixteenth Day of May, 2023

Katherine Kelly Vidal
*Director of the United States Patent and Trademark Office*